(12) United States Patent
Toyama (10) Patent No.: US 10,590,829 B2
(45) Date of Patent: Mar. 17, 2020

(54) CONTROL DEVICE FOR INTERNAL COMBUSTION ENGINE AND CONTROL METHOD FOR COOLING DEVICE

(71) Applicant: Hitachi Automotive Systems, Ltd., Hitachinaka-shi, Ibaraki (JP)

(72) Inventor: Yuichi Toyama, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/123,939

(22) PCT Filed: Sep. 19, 2014

(86) PCT No.: PCT/JP2014/074955
§ 371 (c)(1),
(2) Date: Sep. 6, 2016

(87) PCT Pub. No.: WO2015/132989
PCT Pub. Date: Sep. 11, 2015

(65) Prior Publication Data
US 2017/0016380 A1    Jan. 19, 2017

(30) Foreign Application Priority Data

Mar. 6, 2014    (JP) .................. 2014-044129

(51) Int. Cl.
*F02P 3/02* (2006.01)
*F01P 3/02* (2006.01)
(Continued)

(52) U.S. Cl.
CPC .................. *F01P 3/02* (2013.01); *F01P 5/12* (2013.01); *F01P 7/14* (2013.01); *F01P 11/14* (2013.01);
(Continued)

(58) Field of Classification Search
CPC ........... F01P 5/14; F01P 7/14; F01P 2007/146
(Continued)

(56) References Cited

U.S. PATENT DOCUMENTS 6,216,645 B1 *  4/2001  Bobretzky ............... F01P 5/14
                                            123/41.02
6,955,141 B2 * 10/2005  Santanam .............. F01P 7/165
                                            123/41.08
(Continued)

FOREIGN PATENT DOCUMENTS

DE    87 02 564.7 U1    6/1987
JP    59-213918 A     12/1984
(Continued)

OTHER PUBLICATIONS

German Office Action issued in counterpart German Patent Application No. 112014006441.6 dated Jan. 3, 2017 with partial English translation (Seven (7) pages).
(Continued)

*Primary Examiner* — Phutthiwat Wongwian
*Assistant Examiner* — Robert A Werner
(74) *Attorney, Agent, or Firm* — Crowell & Moring LLP (57) ABSTRACT

The invention of the present application relates to a control device and a control method for a cooling device. A cooling device includes a first cooling water passage of a cylinder head, a second cooling water passage of a cylinder block, a control valve that changes a ratio between a flow rate of the first cooling water passage and a flow rate of the second cooling water passage, and a water pump. Then, the control device controls the control valve so that a ratio of the flow rate of the first cooling water passage increases when a cooling water circulation flow rate is insufficient due to failure of the water pump. Accordingly, it is possible to suppress damage of an engine body while suppressing
(Continued)

deterioration in traveling performance of a vehicle when failure occurs in the water pump.

11 Claims, 8 Drawing Sheets

(51) Int. Cl.
```
F02D 35/02      (2006.01)
F02D 41/00      (2006.01)
F01P 11/14      (2006.01)
F01P 5/12       (2006.01)
F01P 7/14       (2006.01)
F02P 5/04       (2006.01)
F02D 41/22      (2006.01)
```

(52) U.S. Cl.
CPC ....... *F02D 35/027* (2013.01); *F02D 41/0002* (2013.01); *F02P 5/045* (2013.01); *F01P 2003/021* (2013.01); *F01P 2003/024* (2013.01); *F01P 2003/027* (2013.01); *F01P 2005/125* (2013.01); *F01P 2007/146* (2013.01); *F01P 2031/36* (2013.01); *F02D 2041/227* (2013.01); *Y02T 10/42* (2013.01)

(58) Field of Classification Search
USPC .......... 123/41.01, 41.02, 41.08, 41.15, 41.29
See application file for complete search history.

(56) References Cited

U.S. PATENT DOCUMENTS

| | | | | |
|---|---|---|---|---|
| 7,735,461 | B2* | 6/2010 | Vetrovec | F01P 11/20 |
| | | | | 123/41.01 |
| 2004/0055283 | A1 | 3/2004 | Iihoshi et al. | |
| 2012/0216761 | A1* | 8/2012 | Takahashi | F01P 7/16 |
| | | | | 123/41.02 |
| 2013/0047940 | A1* | 2/2013 | Quix | F01P 7/165 |
| | | | | 123/41.08 |
| 2015/0184576 | A1* | 7/2015 | Yi | F01P 3/02 |
| | | | | 123/41.09 |

FOREIGN PATENT DOCUMENTS

| | | | | |
|---|---|---|---|---|
| JP | 61083423 | A * | 4/1986 | ............ F01P 3/2285 |
| JP | 62-158126 | U | 10/1987 | |
| JP | 2001-304028 | A | 10/2001 | |
| JP | 2003-269168 | A | 9/2003 | |
| JP | 2004-116310 | A | 4/2004 | |
| JP | 2005-16434 | A | 1/2005 | |
| JP | 2005-36729 | A | 2/2005 | |
| JP | 2008-121656 | A | 5/2008 | |
| JP | 2008121656 | * | 5/2008 | ............ B60K 11/02 |
| JP | 2012-145005 | A | 8/2012 | |

OTHER PUBLICATIONS

International Search Report (PCT/ISA/210) issued in PCT Application No. PCT/JP2014/074955 dated Dec. 22, 2014 with English-language translation (four (4) pages).
Japanese-language Written Opinion (PCT/ISA/237) issued in PCT Application No. PCT/JP2014/074955 dated Dec. 22, 2014 (four (4) pages).
Reply to the Written Opinion of the International Search Authority issued in PCT Application No. PCT/JP2014/074955 dated Jul. 24, 2015 with English-language translation (eleven (11) pages).
International Preliminary Report on Patentability (PCT/IB/409 & PCT/IB/416) with annexes issued in PCT Application No. PCT/JP2014/074955 dated Oct. 20, 2015 with partial English-language translation (fifteen (15) pages).
English-language translation of International Preliminary Report on Patentability (PCT/IB/338 & PCT/IPEA/409) issued in PCT Application No. PCT/JP2014/074955 dated Sep. 9, 2016, previously filed on Sep. 6, 2016 (four (4) pages).
German-language Office Action issued in counterpart German Application No. 11 2014 006 441.6 dated Aug. 8, 2019 with partial English translation (12 pages).
German-language Office Action issued in counterpart German Application No. 11 2014 006 441.6 dated Dec. 13, 2019 with partial English translation (10 pages).

* cited by examiner

CONTROL DEVICE FOR INTERNAL COMBUSTION ENGINE AND CONTROL METHOD FOR COOLING DEVICE

TECHNICAL FIELD

The present invention relates to a control device for an internal combustion engine and a control method for a cooling device, and particularly to a technique for controlling a cooling device of an internal combustion engine.

BACKGROUND ART

Patent Document 1 discloses an internal combustion engine which includes a cooling device for circulating cooling water by an electric water pump. Here, a vehicle operation mode is changed to a fail-safe mode when failure occurs in the electric water pump and the fail-safe mode includes a limit travel mode of limiting an opening degree of an electric throttle.

REFERENCE DOCUMENT LIST

Patent Document

Patent Document 1: Japanese Patent Application Laid-open Publication JP 2008-121656 A

SUMMARY OF THE INVENTION

Problems to be Solved by the Invention

In the cooling device of the internal combustion engine for a vehicle, when a refrigerant circulation flow rate in the internal combustion engine becomes insufficient due to failure of a pump for circulating a refrigerant and a decrease in discharge flow rate of the pump, a refrigerant flow rate in a cylinder head and a refrigerant flow rate in a cylinder block both decrease.

Then, when the cooling performance of the cylinder head is deteriorated due to a decrease in refrigerant circulation flow rate and hence a temperature of the cylinder head increases, thermal distortion occurs in the cylinder head and further there is a possibility of damaging an engine body due to knocking.

Here, when the radiation of heat from an engine is suppressed by limiting an increase in engine load in order to suppress the damage of the engine body caused by the deterioration in cooling performance of the cylinder head, a problem arises in that the traveling performance of the vehicle is largely deteriorated.

The invention has been made in view of the above-described problems and an object of the invention is to suppress damage of an engine body while suppressing deterioration in traveling performance of a vehicle when a refrigerant circulation flow rate is insufficient.

Means for Solving the Problems

Therefore, a control device according to the present invention is configured to control a cooling device including a first cooling medium passage provided in a cylinder head of an internal combustion engine, a second cooling medium passage provided in a cylinder block of the internal combustion engine, a control valve that changes a ratio between a refrigerant flow rate of the first cooling medium passage and a refrigerant flow rate of the second cooling medium passage, and a pump that circulates the refrigerant, the control device including a valve control unit that controls the control valve such that a ratio of the refrigerant flow rate of the first cooling medium passage becomes larger than that of a case where the pump is not in an abnormal state when the pump is in the abnormal state where an discharge flow rate of an operation state of causing the pump to eject a refrigerant is lower than an intended discharge flow rate by a predetermined value or more.

In addition, a control method according to the present invention is a control method for a cooling device including a first cooling medium passage provided in a cylinder head of an internal combustion engine, a second cooling medium passage provided in a cylinder block of the internal combustion engine, a control valve that changes a ratio between a refrigerant flow rate of the first cooling medium passage and a refrigerant flow rate of the second cooling medium passage, and a pump that circulates the refrigerant, the control method comprising:

a step of detecting whether the pump is in an abnormal state where an discharge flow rate of an operation state of causing the pump to eject a refrigerant is lower than an intended discharge flow rate by a predetermined value or more; and a step of controlling the control valve such that a ratio of the refrigerant flow rate of the first cooling medium passage becomes larger than that of a case where the pump is not in the abnormal state when the pump is in the abnormal state.

Effects of the Invention

According to the above-described invention, since it is possible to suppress deterioration in cooling performance of the cylinder head by increasing the ratio of the refrigerant flow rate of the first cooling medium passage when the pump is in the abnormal state where an discharge flow rate of an operation state of causing the pump to eject a refrigerant is lower than an intended discharge flow rate by a predetermined value or more, it is possible to suppress damage of the cylinder head by suppressing an increase in temperature thereof. Further, since the necessity of suppressing an increase in engine load decreases relatively, it is possible to improve the traveling performance in the abnormal pump state.

MODE FOR CARRYING OUT THE INVENTION

Hereinafter, an embodiment of the invention will be described.

Figure 1:
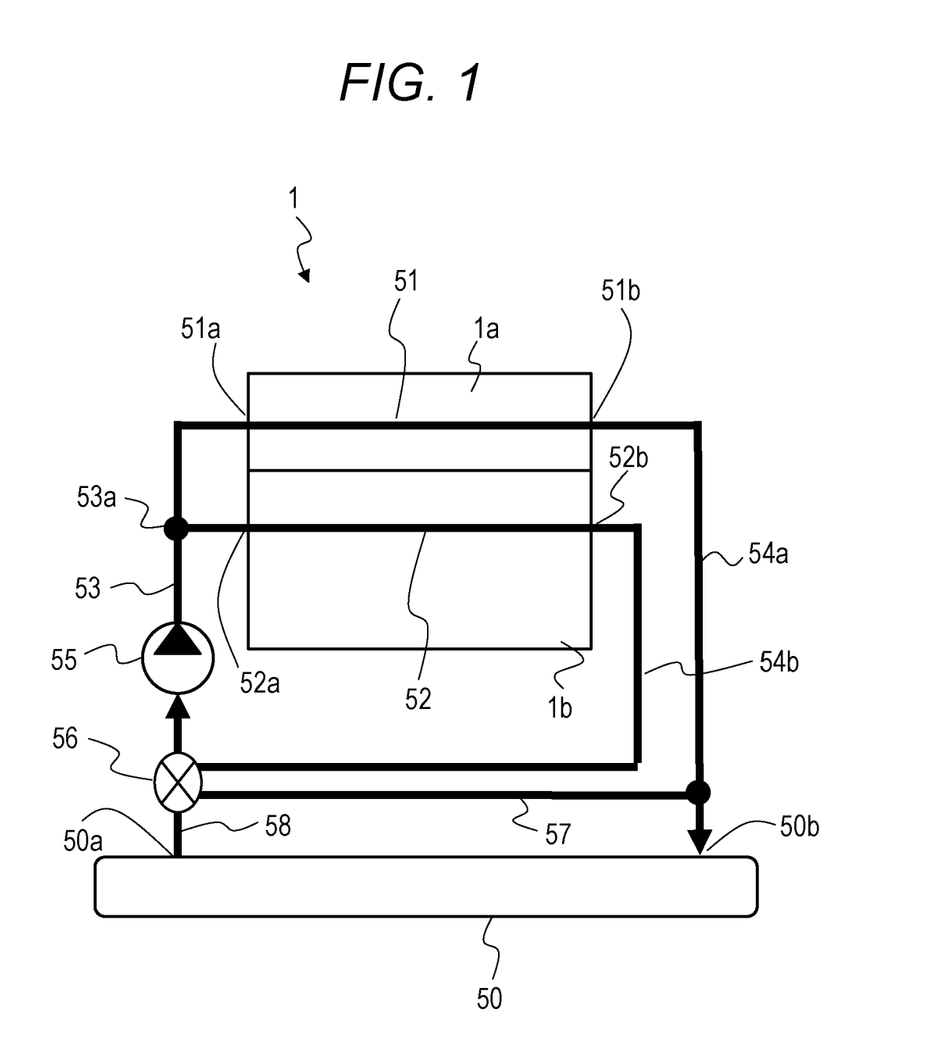
FIG. 1 is a diagram illustrating a cooling device of an internal combustion engine for a vehicle of an embodiment of the invention.

FIG. 1 illustrates an example of a cooling device of an internal combustion engine for a vehicle that employs a control device according to the invention.

The cooling device illustrated in FIG. 1 includes a radiator 50, a first cooling water passage (first cooling medium passage) 51, a second cooling water passage (second cooling medium passage) 52, a cooling water supply path 53, an electric water pump 55, a flow rate control valve 56, a cooling water returning path 54a, a bypass path 57, and a cooling water returning path 54b. First cooling water passage 51 is provided in a cylinder head 1a of an internal combustion engine 1. Second cooling water passage 52 is provided in a cylinder block 1b of internal combustion engine 1. Cooling water supply path 53 has one end connected to an outlet 50a of radiator 50 and is halfway branched into two parts to be respectively connected to inlet sides 51a and 52a of cooling water passages 51 and 52. Electric water pump 55 is provided in cooling water supply path 53 between a branch part 53a of cooling water supply path 53 and radiator 50 and discharges cooling water toward cooling water passages 51 and 52. Flow rate control valve 56 is provided in cooling water supply path 53 between electric water pump 55 and radiator 50. Cooling water returning path 54a has one end connected to an outlet side 51b of first cooling water passage 51 and the other end connected to an inlet 50b of radiator 50. Bypass path 57 has one end connected to a middle position of cooling water returning path 54a and the other end connected to flow rate control valve 56. Cooling water returning path 54b has one end connected to an outlet side 52b of second cooling water passage 52 and the other end connected to flow rate control valve 56. The cooling device is a system which circulates cooling water or cooling liquid as a cooling medium in internal combustion engine 1 by electric water pump 55.

Three channels including bypass path 57, cooling water returning path 54b, and cooling water supply path 53 extending from outlet 50a of radiator 50 are connected to flow rate control valve 56 as a cooling water inflow side. Cooling water supply path 53 reaching a suction port of electric water pump 55 is connected to flow rate control valve 56 as a cooling water outflow side.

Then, flow rate control valve 56 is configured to adjust the amount of cooling water circulated through the three channels by changing the opening areas of the three channels at the inflow side in response to, for example, an operation angle of a rotor.

That is, a ratio between the amount of the cooling water passing through radiator 50 after passing through first cooling water passage 51 and the amount of the cooling water bypassing radiator 50 after passing through first cooling water passage 51 is changed so that a ratio between the amount of the cooling water flowing to first cooling water passage 51 and the amount of the cooling water flowing to second cooling water passage 52 can be changed.

For example, when the opening area of bypass path 57 is increased by flow rate control valve 56 and the opening area of a radiator passing path 58 extending from outlet 50a of radiator 50 to flow rate control valve 56 is decreased, it is possible to increase the amount of the cooling water bypassing radiator 50 to be re-circulated among the cooling water passing through first cooling water passage 51. Then, when the amount of the cooling water bypassing radiator 50 to be re-circulated is increased in a warming state, a warming operation can be promoted because the amount of heat radiated from the cooling water is decreased.

Furthermore, for example, if flow rate control valve 56 decreases the opening area of cooling water returning path 54b and increases the opening area of the channel returned from first cooling water passage 51, the amount of the cooling water circulated in first cooling water passage 51 can be increased and the amount of the cooling water circulated in second cooling water passage 52 can be relatively decreased.

Here, flow rate control valve 56 can have, for example, the following configuration. When the rotor angle of flow rate control valve 56 is set to a minimal value, the flow rate in the channel bypassing radiator 50 becomes maximal. When the rotor angle is increased, the flow rate in the bypass channel is decreased and the flow rate in radiator 50 is relatively increased. When the rotor angle is further increased, the amount of the cooling water circulated in second cooling water passage 52 is decreased and the amount of the cooling water circulated in first cooling water passage 51 is increased.

Figure 2:
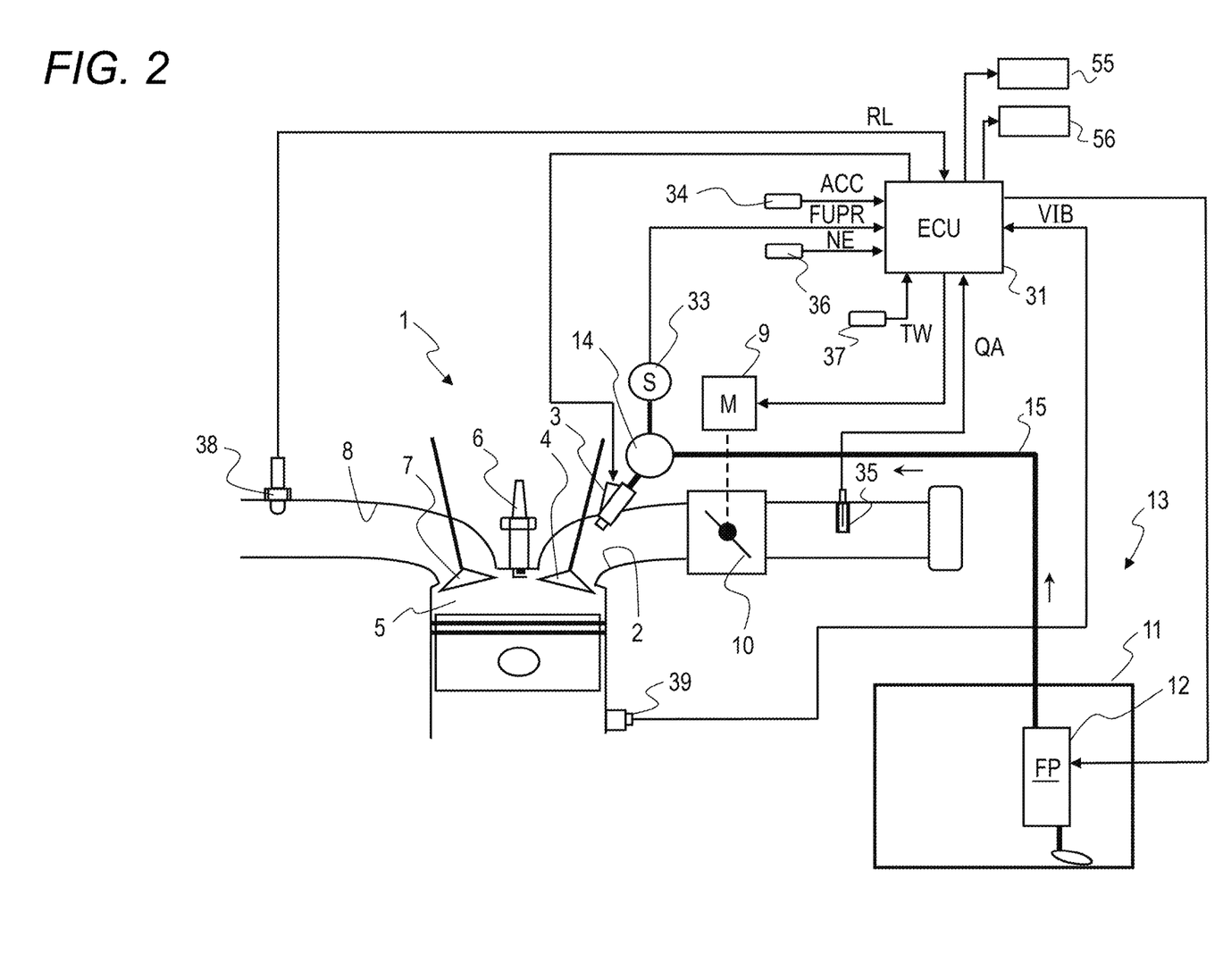
FIG. 2 is a diagram illustrating an internal combustion engine for a vehicle of the embodiment of the invention.

FIG. 2 is a diagram illustrating an example of internal combustion engine 1 illustrated in FIG. 1.

Internal combustion engine 1 illustrated in FIG. 2 is a four-cycle multi-cylinder engine mounted on a vehicle as a driving source.

A fuel injection valve 3 is provided in an intake port 2 of each cylinder of internal combustion engine 1. Fuel injection valve 3 injects fuel toward an umbrella portion of an intake valve 4 from the upstream side of intake valve 4.

The fuel injected to fuel injection valve 3 is suctioned into a combustion chamber 5 through intake valve 4 in an intake cycle and is burned by a spark ignition of an ignition plug 6.

In addition, a cylinder injection type internal combustion engine in which fuel injection valve 3 directly injects fuel into combustion chamber 5 can be used.

A combustion gas inside combustion chamber 5 is discharged to an exhaust passage 8 through an exhaust valve 7 in an exhaust cycle.

Internal combustion engine 1 includes an electronic control throttle 10 which is operated by a throttle motor 9 and the intake air amount of internal combustion engine 1 is adjusted by the opening degree of electronic control throttle 10.

Furthermore, internal combustion engine 1 includes a fuel supply device 13 which pumps fuel inside a fuel tank 11 toward fuel injection valve 3.

Fuel supply device 13 includes fuel tank 11, a fuel pump 12, a fuel gallery pipe 14, and a fuel supply pipe 15.

Fuel pump 12 is an electric pump disposed inside fuel tank 11 and suctions fuel inside fuel tank 11 to discharge the fuel.

One end of fuel supply pipe 15 is connected to an discharge port of fuel pump 12, the other end of fuel supply pipe 15 is connected to fuel gallery pipe 14, and a fuel supply port of fuel injection valve 3 of each cylinder is connected to fuel gallery pipe 14.

An electronic control device 31 includes a microcomputer including a CPU, a ROM, a RAM, an input/output circuit, and the like. Electronic control device 31 controls a main body of internal combustion engine 1 so that the fuel injection operation of fuel injection valve 3, the ignition operation of ignition plug 6, the opening degree of electronic control throttle 10, and the like are controlled, controls electric water pump 55 and flow rate control valve 56 constituting the cooling device, and controls fuel pump 12 constituting fuel supply device 13.

In addition, a plurality of electronic control devices having different control targets can be provided instead of electronic control device 31.

Electronic control device 31 inputs signals output from various sensors for detecting an operation state of internal combustion engine 1.

Examples of various sensors described above include a fuel pressure sensor 33 which detects a fuel pressure FUPR inside a fuel gallery pipe 16, an accelerator opening degree sensor 34 which detects a stepping amount of an accelerator pedal (not illustrated), in other words, an accelerator opening degree ACC, an air flow sensor 35 which detects an intake air flow amount QA of internal combustion engine 1, a rotation sensor 36 which detects a rotation speed NE of internal combustion engine 1, a water temperature sensor 37 which detects a cooling water temperature TW of internal combustion engine 1, an air fuel ratio sensor 38 which detects an air fuel ratio AF of a fuel-air mixture of internal combustion engine 1 based on an oxygen concentration in exhaust, and a knock sensor 39 which detects a vibration VIB caused by the knocking of internal combustion engine 1.

Then, electronic control device 31 controls the opening degree of electronic control throttle 10 based on accelerator opening degree ACC and the like, controls the fuel injection amount of fuel injection valve 3 based on intake air flow amount QA, engine rotation speed NE, cooling water temperature TW, air fuel ratio AF, and the like, controls the ignition timing of ignition plug 6 based on an engine load, an engine rotation speed, occurrence of knocking, and the like, and controls a fuel discharge amount of fuel pump 12 based on an engine load, an engine rotation speed, and the like.

Furthermore, electronic control device 31 controls the discharge flow rate of electric water pump 55 based on cooling water temperature TW and the like. Specifically, electronic control device 31 calculates a target rotation speed NWPtg [rpm] of electric water pump 55 based on cooling water temperature TW and the like and outputs calculated target rotation speed NWPtg, as a pump control instruction value, to electric water pump 55.

A controller (microcomputer) integrated with electric water pump 55 receives a signal (rotation speed instruction signal) of target rotation speed NWPtg transmitted from electronic control device 31 and controls a voltage applied to a motor constituting electric water pump 55 by PWM control or the like so that an actual rotation speed NWP [rpm] approaches target rotation speed NWPtg.

That is, electronic control device 31 and the controller provided in electric water pump 55 have a calculation function (pump control unit) of controlling electric water pump 55.

Furthermore, electronic control device 31 has a function (diagnosis unit) of diagnosing whether an discharge flow rate becomes smaller than an instruction value due to the failure of electric water pump 55 so that a cooling water circulation flow rate is insufficient, a function (flow rate ratio setting unit and distribution ratio setting unit) of changing a ratio between the cooling water flow rate of first cooling water passage 51 and the cooling water flow rate of second cooling water passage 52 in response to the diagnosis result, a function (valve control unit) of controlling flow rate control valve 56 in response to the determined ratio, a function (ignition control unit) of controlling the ignition timing in response to the diagnosis result, a function (engine load control unit) of limiting an increase in engine load in response to the diagnosis result, and the like.

Figure 3:
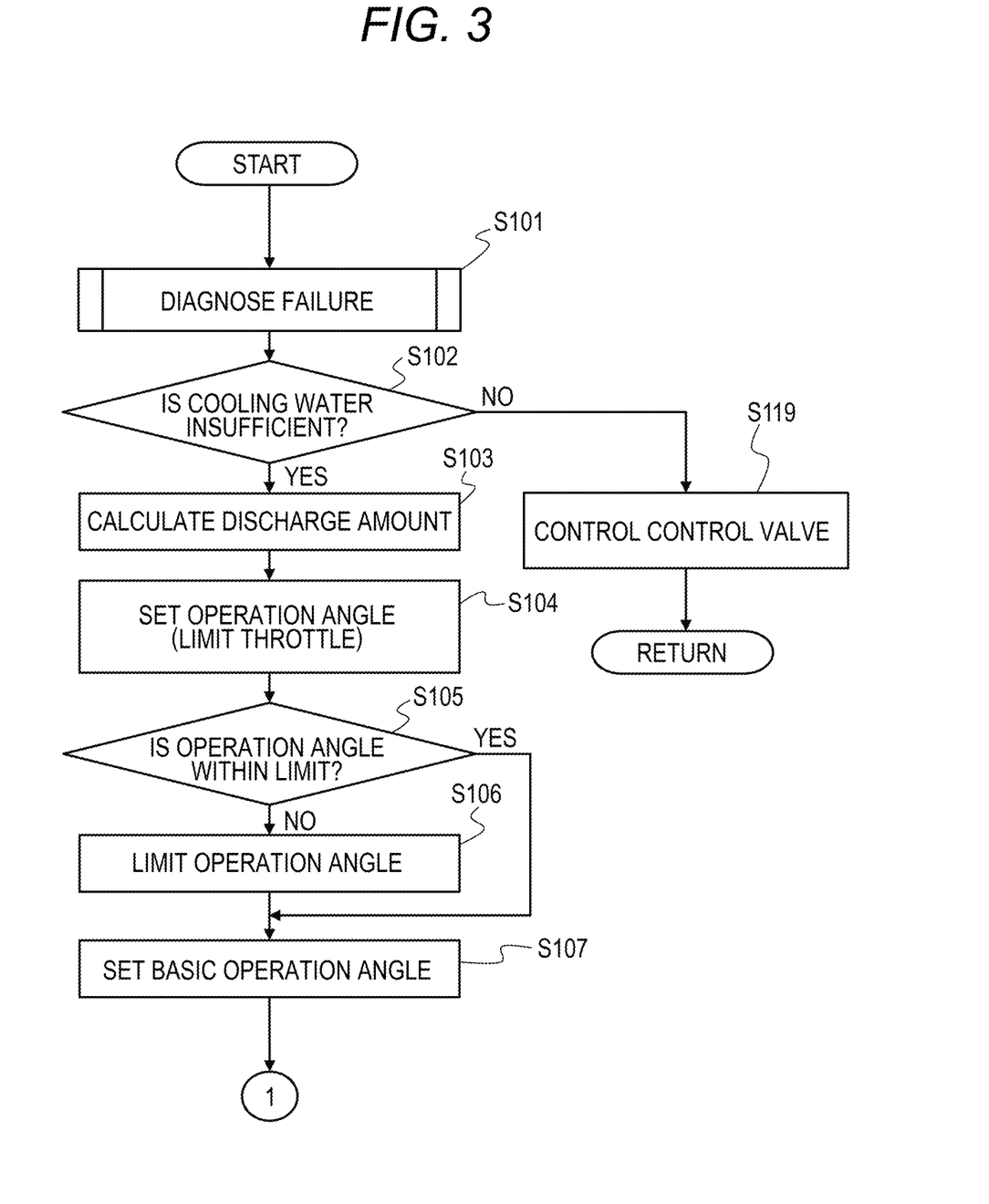
FIG. 3 is a flowchart illustrating a flow of a process of controlling a flow rate control valve of the embodiment of the invention.
Figure 4:
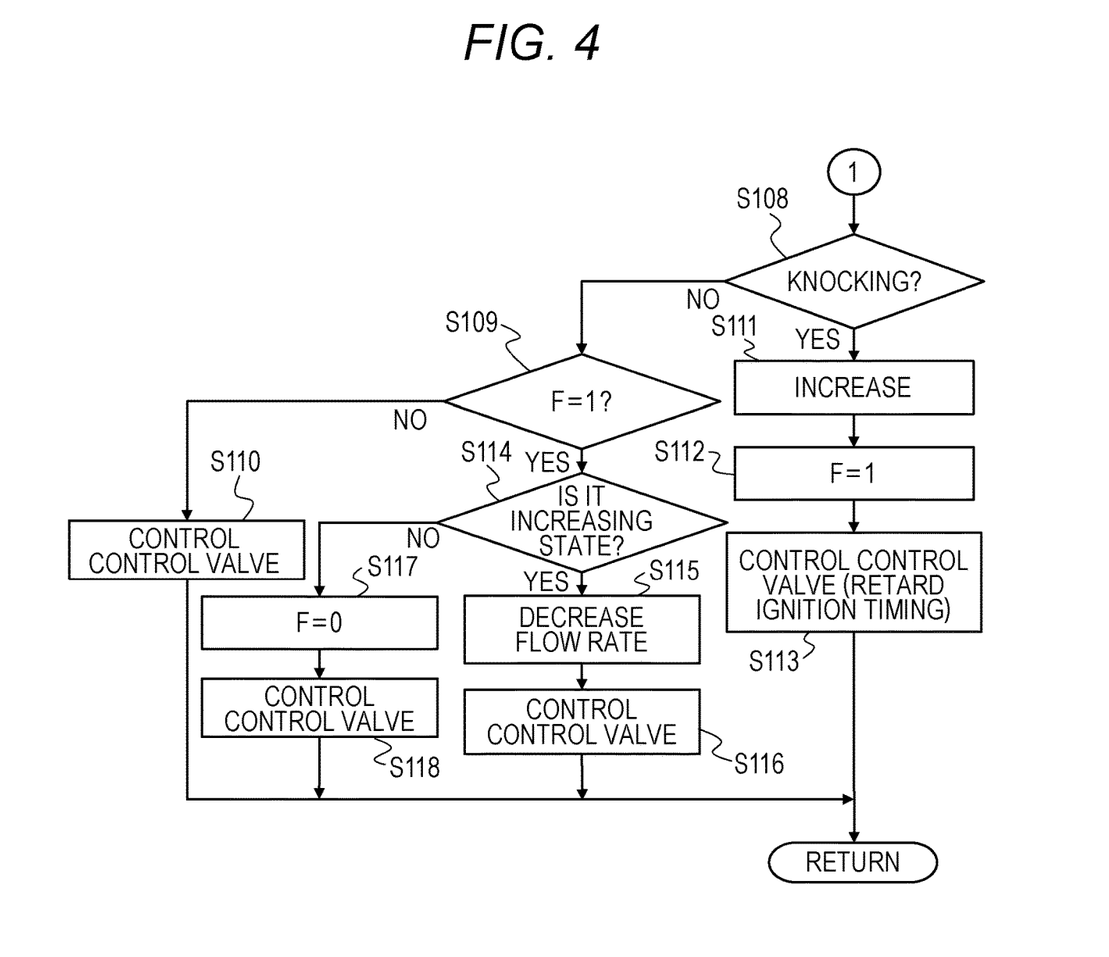
FIG. 4 is a flowchart illustrating a flow of a process of controlling the flow rate control valve of the embodiment of the invention.

The flowcharts of FIGS. 3 and 4 illustrate a process of controlling flow rate control valve 56 by electronic control device 31, that is, the functions as the diagnosis unit, the flow rate ratio setting unit, the valve control unit, the ignition control unit, and the engine load control unit.

A routine illustrated in the flowcharts of FIGS. 3 and 4 is performed as an interruption process by electronic control device 31 every predetermined time.

In step S101, electronic control device 31 diagnoses whether failure has occurred in electric water pump 55, specifically, whether the cooling water circulation flow rate is insufficient due to a decrease in discharge flow rate caused by the failure of electric water pump 55.

Figure 5:
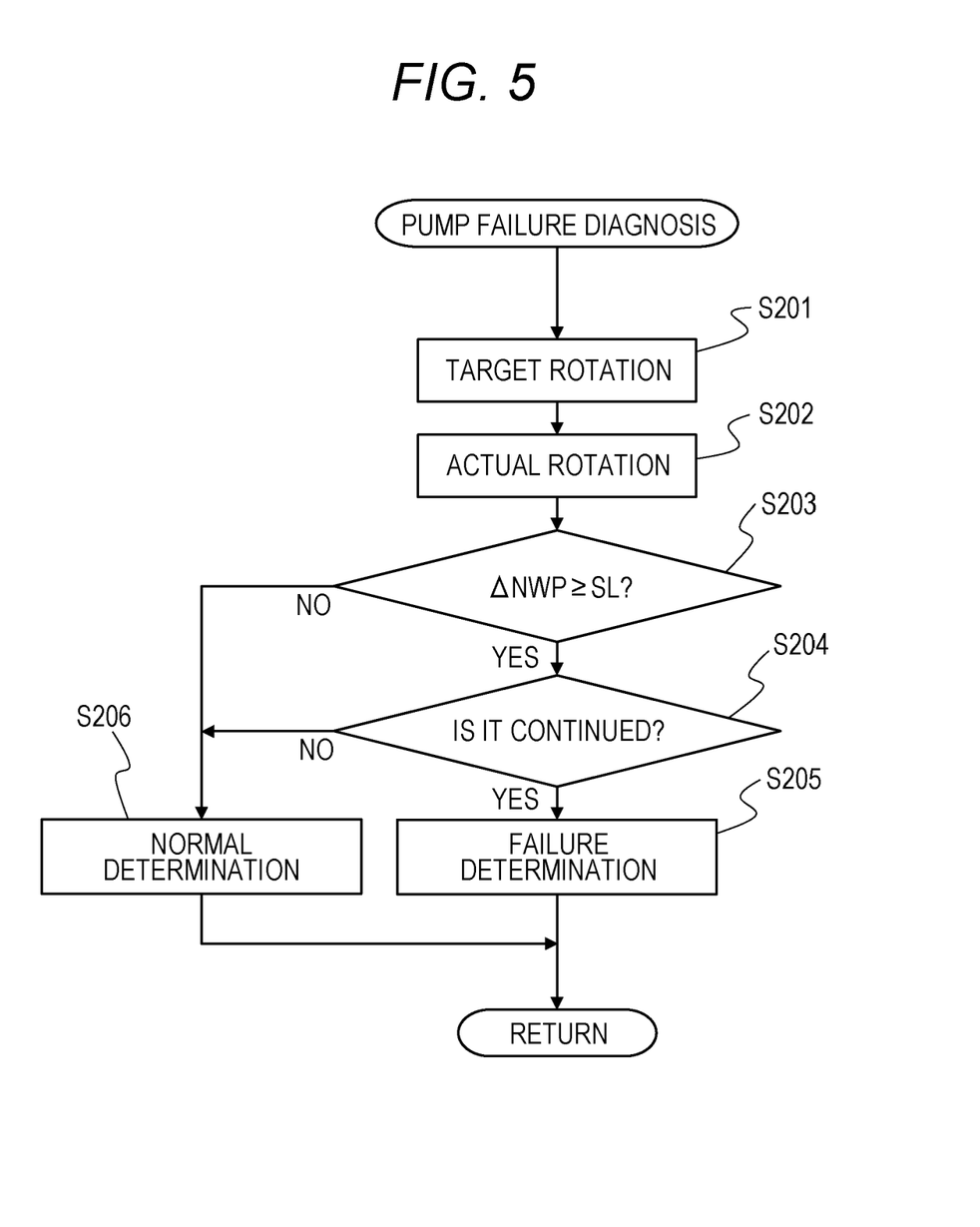
FIG. 5 is a flowchart illustrating a flow of a process of diagnosing failure of an electric water pump of the embodiment of the invention.

Here, the detail of the diagnosis process (the function of the diagnosis unit) in step S101 will be described in accordance with the flowchart of FIG. 5.

Electronic control device 31 reads target rotation speed NWPtg [rpm] of electric water pump 55 determined in accordance with cooling water temperature TW and the like in step S201 and reads actual rotation speed NWP [rpm] of electric water pump 55 in next step S202.

When the motor driving electric water pump 55 includes an encoder or a magnetic pole position sensor, electronic control device 31 can scrape actual rotation speed NWP of electric water pump 55 from the output of the sensor. When the motor is controlled in a sensorless state without the sensor, electronic control device 31 can scrape actual rotation speed NWP from the estimation result of the rotation position of the motor. Furthermore, electronic control device 31 can scrape information on actual rotation speed NWP from the controller provided in electric water pump 55.

In step S203, electronic control device 31 determines whether a deviation $\Delta$NWP ($\Delta$NWP=NWPtg-NWP) between target rotation speed NWPtg and actual rotation speed NWP is equal to or larger than a predetermined value SL.

Then, when deviation $\Delta$NWP is smaller than predetermined value SL, electronic control device 31 proceeds to step S206 and determines that an intended discharge flow rate is obtained so that the cooling water circulation flow rate is sufficient, that is, electric water pump 55 is in a normal state.

Meanwhile, when deviation $\Delta$NWP is equal to or larger than predetermined value SL, electronic control device 31 proceeds to step S204 and determines whether a state where deviation $\Delta$NWP is equal to or larger than predetermined value SL has been continued for a setting time or more.

The setting time is a time set based on a response delay or the like in the rotation speed control of electric water pump 55 and is set to a time longer than a time necessary for actual rotation speed NWP to follow a change in target rotation speed NWPtg.

Thus, when a state where deviation $\Delta$NWP is equal to or larger than predetermined value SL has been continued for the setting time or more, it is considered that actual rotation speed NWP does not increase to target rotation speed NWPtg.

When a state where deviation $\Delta$NWP is equal to or larger than predetermined value SL has not been continued for the setting time or more, there is a possibility that the current state is a transient state where actual rotation speed NWP follows a change in target rotation speed NWPtg. For this reason, electronic control device 31 proceeds to step S206 and determines that electric water pump 55 is in the normal state where the intended discharge flow rate is obtained.

Meanwhile, when a state where deviation ΔNWP is equal to or larger than predetermined value SL has been continued for the setting time or more, electronic control device 31 proceeds to step S205 and determines that electric water pump 55 is in a failure state where the intended discharge flow rate is not obtained, that is, the cooling water circulation flow rate is insufficient.

The embodiment illustrates a countermeasure in the event of failure in which the discharge flow rate of electric water pump 55 decreases compared with the normal state. For example, when the failure in which electric water pump 55 is not operated occurs due to short-circuiting or locking, electronic control device 31 performs a process different from the process illustrated in the flowcharts of FIGS. 3 and 4.

The process performed by electronic control device 31 in the event of the failure in which electric water pump 55 is not operated is, for example, a process of causing a hybrid vehicle to travel by an electric motor while stopping internal combustion engine 1 or a process of performing a cylinder cutoff operation of internal combustion engine 1 so that a limp home mode is performed by internal combustion engine 1 and the electric motor.

When electronic control device 31 proceeds to step S205 to determine the failure, it is determined that actual rotation speed NWP is lower than target rotation speed NWPtg and the actual discharge flow rate is lower than the discharge flow rate suitable for target rotation speed NWPtg, that is, the discharge flow rate is insufficient. In other words, electronic control device 31 determines in step S205 that the actual circulation flow rate is insufficient compared with the cooling water circulation flow rate required to keep the temperature of the cooling water at an appropriate temperature.

When electronic control device 31 diagnoses the occurrence of the failure of electric water pump 55 in step S101, a routine proceeds to step S102 to determine whether the failure of electric water pump 55 has been diagnosed.

Then, when electronic control device 31 determines that electric water pump 55 is normal and the cooling water circulation flow rate is sufficient in step S102, a routine proceeds to step S119.

In step S119, electronic control device 31 sets a target position (target rotor operation degree) of flow rate control valve 56 to a standard position (standard angle) so that a ratio between the cooling water flow rate of first cooling water passage 51 and the cooling water flow rate of second cooling water passage 52 becomes a standard value.

Electronic control device 31 can store the standard position as a fixed value in advance. Furthermore, electronic control device 31 can change the standard position in accordance with an operation condition such as cooling water temperature TW.

In addition, when the amount of the cooling water bypassing radiator 50 is adjusted by flow rate control valve 56 as in the cooling device illustrated in FIG. 1, electronic control device 31 can change the standard position in order to adjust the bypassing flow rate.

Meanwhile, when electronic control device 31 determines that the cooling water circulation flow rate is insufficient due to the failure of electric water pump 55 in step S102, a routine proceeds to step S103 so that the actual discharge flow rate [L/min] of electric water pump 55 is calculated from actual rotation speed NWP of electric water pump 55.

Next, electronic control device 31 sets a target position (target rotor operation angle AGtg) of flow rate control valve 56 in accordance with the actual discharge flow rate of electric water pump 55, in other words, the insufficiency of the discharge flow rate in step S104. That is, electronic control device 31 changes the ratio between the cooling water flow rate of first cooling water passage 51 and the cooling water flow rate of second cooling water passage 52 from the standard value in order to handle the insufficiency of the discharge flow rate.

Specifically, electronic control device 31 changes target rotor operation angle AGtg of flow rate control valve 56 to relatively decrease the ratio of the cooling water flow rate of second cooling water passage 52 by increasing the ratio of the cooling water flow rate of first cooling water passage 51. Accordingly, a decrease in cooling water flow rate of cylinder head 1a caused by a decrease in discharge flow rate of electric water pump 55 is suppressed.

Furthermore, in step S104, electronic control device 31 performs a process of limiting a maximal intake air amount of internal combustion engine 1 to be lower than that of a case where electric water pump 55 is normal and the discharge flow rate is not insufficient, that is, a process of limiting an increase in load of internal combustion engine 1 to be lower than that of the normal state. As a process of limiting an increase in the intake air amount, electronic control device 31 performs, for example, a process of decreasing an upper limit of a target value in opening degree control of electronic control throttle 10 to be lower than that of a case where electric water pump 55 is normal.

Since the maximal intake air amount of internal combustion engine 1 is limited to be lower than that of the normal state, the generation of heat in internal combustion engine 1 is suppressed and hence the overheat of internal combustion engine 1 can be suppressed while the discharge flow rate of electric water pump 55 decreases.

In addition, electronic control device 31 can limit the maximal intake air amount of internal combustion engine 1 to a lower value as the discharge flow rate of electric water pump 55 further decreases. Furthermore, electronic control device 31 cancels the process of limiting the maximal intake air amount of internal combustion engine 1 to be lower than that of the normal state when the discharge flow rate of electric water pump 55 decreases by an amount smaller than a predetermined amount and hence can control an engine load as in a case where electric water pump 55 is normal.

When target rotor operation angle AGtg is set in step S104, electronic control device 31 proceeds to step S105 and determines whether target rotor operation angle AGtg set in step S104 exceeds a limit value AGlimit.

Here, when target rotor operation angle AGtg set in step S104 exceeds limit value AGlimit, electronic control device 31 proceeds to step S106 and sets limit value AGlimit to target rotor operation angle AGtg so that target rotor operation angle AGtg exceeding limit value AGlimit is not set.

Meanwhile, when target rotor operation angle AGtg set in step S104 does not exceed limit value AGlimit, electronic control device 31 proceeds to step S107 without changing target rotor operation angle AGtg set in step S104 by skipping step S106.

As will be described in detail below, upper limit value AGlimit is an upper limit value of the ratio of the cooling water flow rate of first cooling water passage 51, in other words, a value corresponding to a lower limit value of the ratio of the cooling water flow rate of second cooling water passage 52.

In the description below, a process of setting target rotor operation angle AGtg in steps S104 to S106 will be described in detail with reference to FIG. 6.

In addition, in the embodiment, a direction in which the rotor angle of flow rate control valve 56 increases is set to a direction in which the ratio of the cooling water flow rate of first cooling water passage 51 increases. Here, the ratio of the cooling water flow rate of first cooling water passage 51 can be decreased in accordance with a decrease in rotor angle.

Figure 6:
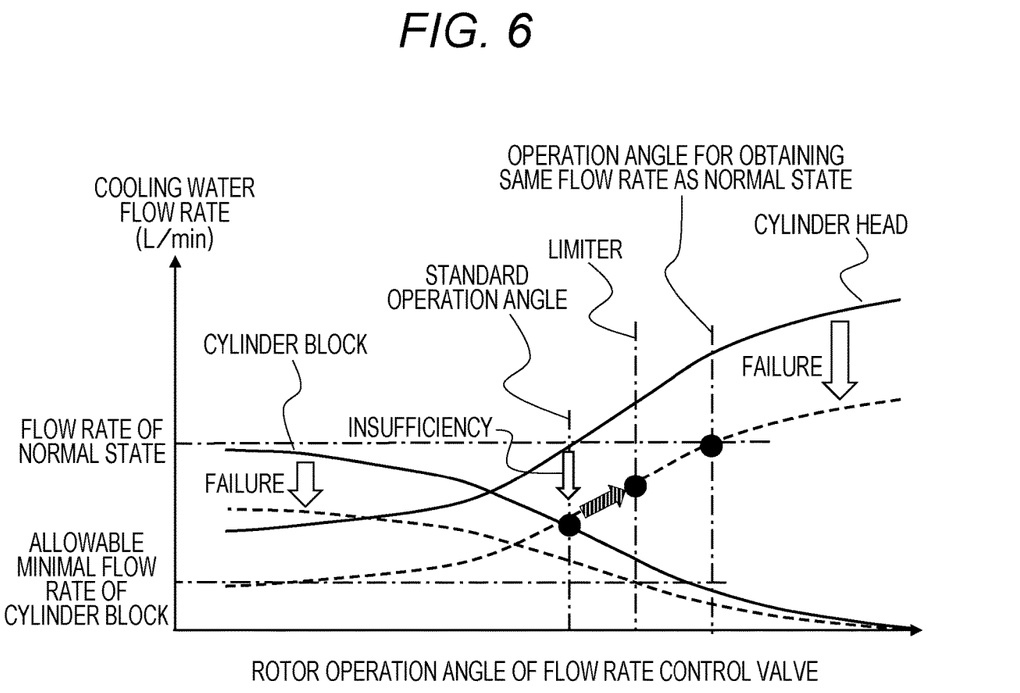
FIG. 6 is a diagram illustrating control characteristics of a rotor operation angle of the flow rate control valve of the embodiment of the invention.

FIG. 6 is a diagram illustrating the cooling water flow rate [L/min] of first cooling water passage 51 and the cooling water flow rate [L/min] of second cooling water passage 52 every rotor operation angle of flow rate control valve 56.

The solid line of FIG. 6 indicates a characteristic of the normal state where actual rotation speed NWP of electric water pump 55 is converged to target rotation speed NWPtg and the discharge flow rate corresponding to target rotation speed NWPtg can be obtained. Meanwhile, the dotted line of FIG. 6 indicates a characteristic in the failure state where actual rotation speed NWP of electric water pump 55 does not reach target rotation speed NWPtg and the actual discharge flow rate becomes lower than the discharge flow rate suitable for target rotation speed NWPtg.

In the characteristic example illustrated in FIG. 6, when the rotor operation angle of flow rate control valve 56 is changed, a state where the cooling water flow rate of second cooling water passage 52 is minimal and the cooling water flow rate of first cooling water passage 51 is maximal is continuously changed to a state where the cooling water flow rate of second cooling water passage 52 is maximal and the cooling water flow rate of first cooling water passage 51 is minimal.

Then, when the actual discharge flow rate becomes lower than the discharge flow rate suitable for target rotation speed NWPtg due to the failure of electric water pump 55, the cooling water flow rate decreases in both first cooling water passage 51 and second cooling water passage 52.

Here, the cooling water flow rate of first cooling water passage 51 in the normal pump state is obtained from the discharge flow rate suitable for target rotation speed NWPtg and a standard value AGst of target rotor operation angle AGtg of flow rate control valve 56.

Furthermore, the cooling water flow rate of first cooling water passage 51 when target rotor operation angle AGtg is kept at standard value AGst in the failure state of the pump is obtained from the actual discharge flow rate of electric water pump 55 and standard value AGst of target rotor operation angle AGtg of flow rate control valve 56 in the failure state calculated in step S103.

A difference between the obtained cooling water flow rate of first cooling water passage 51 in the failure state of the pump and the obtained cooling water flow rate of first cooling water passage 51 in the normal pump state becomes the insufficiency of the cooling water flow rate of first cooling water passage 51.

When target rotor operation angle AGtg of flow rate control valve 56 is changed in a direction in which the ratio of the cooling water flow rate of first cooling water passage 51 increases in the failure state of the pump in which the cooling water flow rate of first cooling water passage 51 is insufficient, the insufficiency of the cooling water flow rate of first cooling water passage 51 can be decreased and hence the cooling water flow rate may be increased to the cooling water flow rate in the normal pump state.

Here, when the ratio of the cooling water flow rate of first cooling water passage 51 is increased, the cooling water flow rate of second cooling water passage 52 is decreased relatively, but the cooling water flow rate of second cooling water passage 52 needs to be kept at a predetermined amount or more.

That is, the limit value is the upper limit value of the cooling water flow rate of first cooling water passage 51 determined from the lower limit value of the cooling water flow rate of second cooling water passage 52.

Here, electronic control device 31 calculates target rotor operation angle AGtg required to increase the cooling water flow rate of first cooling water passage 51 to the cooling water flow rate in the normal pump state in step S104. Furthermore, when electronic control device 31 determines that target rotor operation angle AGtg for solving the insufficiency of the cooling water flow rate exceeds limit value AGlimit in step S105, a routine proceeds to step S106 so that limit value AGlimit is set to target value AGtg in the failure state of the pump.

According to the configuration, when the discharge flow rate of the pump decreases due to the failure, the insufficiency of the cooling water in cylinder head 1a can be suppressed. Thus, the damage of internal combustion engine 1 caused by an increase in temperature of cylinder head 1a can be suppressed and hence a minimal amount or more of cooling water can flow to cylinder block 1b. Furthermore, since the cooling water flow rate of cylinder head 1a is increased, a limitation on the engine load used to suppress an increase in temperature of cylinder head 1a can be loosened and hence deterioration in traveling performance in the failure state of the pump can be suppressed.

In the above-described configuration, when target rotor operation angle AGtg for solving the insufficiency of the flow rate does not exceed limit value AGlimit, rotor operation angle AGtg in which the cooling water flow rate of first cooling water passage 51 is increased to the cooling water flow rate in the normal pump state is set as final target rotor operation angle AGtg.

Here, the invention is not limited to a configuration in which the cooling water flow rate of first cooling water passage 51 is increased to the cooling water flow rate in the normal pump state. For example, electronic control device 31 can set the target flow rate in the failure state of the pump to be lower than the cooling water flow rate in the normal pump state and set target rotor operation angle AGtg in which the cooling water flow rate of first cooling water passage 51 is increased to the target flow rate in the failure state.

In step S107 of the flowchart of FIG. 3, electronic control device 31 sets target rotor operation angle AGtg set in step S104 or target rotor operation angle AGtg subjected to the limit process in step S106 as a basic value AGtgba of the target rotor operation angle in the failure state of the pump.

Next, electronic control device 31 proceeds to step S108 illustrated in the flowchart of FIG. 4 and determines whether knocking has occurred in internal combustion engine 1 based on the output signal of knock sensor 39.

Then, when the knocking has not occurred, electronic control device 31 proceeds to step S109 and determines whether a flag F representing the setting state of the target rotor operation angle as the knocking countermeasures is enabled.

As will be described below, a case where flag F is enabled represents a case where the target rotor operation angle is set as the knocking countermeasures and a case where flag F is disabled represents a case where the target rotor operation angle is not set as the knocking countermeasures.

When flag F is disabled, electronic control device 31 proceeds to step S110 and sets basic value AGtgba of the target rotor operation angle in the failure state of the pump set in step S107 as final target rotor operation angle AGtgde in the failure state of the pump. Then, electronic control device 31 adjusts the ratio between the cooling water flow rate of first cooling water passage 51 and the cooling water flow rate of second cooling water passage 52 by controlling the rotor operation angle of flow rate control valve 56 in accordance with target rotor operation angle AGtgde.

Meanwhile, when electronic control device 31 determines that the knocking has occurred in step S108, a routine proceeds to step S111 so that basic value AGtgba of target rotor operation angle AGtg in the failure state of the pump is gradually changed to a value at which the cooling water flow rate of first cooling water passage 51 can be increased to the same level as the normal pump state and the changed value is set as final target rotor operation angle AGtgde.

That is, in step S111, electronic control device 31 cancels the limitation on the rotor operation angle imposed by limit value AGlimit and selects target rotor operation angle AGtg in which the cooling water flow rate of cylinder head 1a in the failure state of the pump can be increased to a value close to the cooling water flow rate of cylinder head 1a in the normal pump state.

When basic value AGtgba of target rotor operation angle AGtg in the failure state of the pump is limit value AGlimit, electronic control device 31 increases the cooling water flow rate of cylinder head 1a more than limit value AGlimit up to target rotor operation angle AGtg in which the cooling water flow rate of cylinder block 1b becomes smaller than the minimal flow rate.

Here, in step S113, electronic control device 31 can set target rotor operation angle AGtg in which the cooling water flow rate of first cooling water passage 51 is increased to the flow rate lower than the cooling water flow rate of cylinder head 1a in the normal pump state.

Next, electronic control device 31 enables flag F in step S112 and then proceeds to step S113.

In step S113, electronic control device 31 adjusts the ratio between the cooling water flow rate of first cooling water passage 51 and the cooling water flow rate of second cooling water passage 52 by controlling the rotor operation angle of flow rate control valve 56 in accordance with target rotor operation angle AGtgde set in step S111. Furthermore, electronic control device 31 performs control of retarding the ignition timing in step S113 along with the control of the rotor operation angle of flow rate control valve 56.

When the knocking occurs while the discharge flow rate of electric water pump 55 decreases in the failure state of the pump, electronic control device 31 promotes the cooling of cylinder head 1a by changing target rotor operation angle AGtg so that the cooling water flow rate of cylinder head 1a increases, and further performs a process of retarding the ignition timing of internal combustion engine 1 in order to promptly solve the knocking.

That is, there is a case where, even when control of increasing the cooling water flow rate of cylinder head 1a is performed, the knocking is not immediately solved by a decrease in temperature of cylinder head 1a and the knocking suppressing effect due to an increase in cooling water flow rate of cylinder head 1a is exhibited slowly. Here, electronic control device 31 can obtain the knocking suppressing effect by retarding the ignition timing to promptly solve the knocking while increasing the cooling water flow rate.

When the knocking continuously occurs in the failure state of the pump, electronic control device 31 proceeds from step S108 to steps S111 to S113 in order to solve the knocking. Meanwhile, when the knocking does not occur, electronic control device 31 proceeds from step S108 to step S109.

Here, flag F in enabled in step S112 in the knocking occurrence state. When the knocking occurrence state is solved and a routine proceeds to step S109, electronic control device 31 determines that flag F is enabled and proceeds to step S114.

In step S114, electronic control device 31 determines whether target rotor operation angle AGtgde is set so that the cooling water flow rate of cylinder head 1a increases in relation to basic value AGtgba of target rotor operation angle AGtg, that is, whether the cooling water flow rate of cylinder head 1a is temporarily increased to solve the knocking.

Here, when target rotor operation angle AGtgde is changed so that the cooling water flow rate of cylinder head 1a increases in relation to basic value AGtgba of target rotor operation angle AGtg, electronic control device 31 proceeds to step S115 and sets, as current target rotor operation angle AGtgde, a value obtained by changing a precedent value of target rotor operation angle AGtgde by a predetermined value $\Delta AG$ in a direction in which the cooling water flow rate of cylinder head 1a is decreased.

Then, electronic control device 31 proceeds to step S116 and controls the rotor operation angle of flow rate control valve 56 in accordance with target rotor operation angle AGtgde changed in step S115 whenever this routine is performed.

For example, when a direction in which the cooling water flow rate of cylinder head 1a is decreased is a direction in which the rotor operation angle decreases, electronic control device 31 sets, as current target rotor operation angle AGtgde, an operation angle obtained by subtracting predetermined value $\Delta AG$ from precedent target rotor operation angle AGtgde in step S115.

That is, when the knocking is detected, electronic control device 31 changes target rotor operation angle AGtgde in a direction in which the cooling water flow rate of cylinder head 1a is increased. Then, when the knocking is converged, electronic control device 31 gradually changes target rotor operation angle AGtgde in a direction in which the cooling water flow rate of cylinder head 1a decreases so that the cooling water flow rate of cylinder block 1b is relatively increased gradually.

When the cooling water flow rate of cylinder head 1a is largely decreased based on the non-detection of the knocking, there is a possibility that the knocking occurs again because the cooling water flow rate of cylinder head 1a decreases before the temperature of cylinder head 1a sufficiently decreases. Here, when the knocking is converged, electronic control device 31 gradually decreases the cooling water flow rate of cylinder head 1a to suppress the repeated occurrence of the knocking.

When target rotor operation angle AGtgde returns to basic value AGtgba as a result of the process in step S115, electronic control device 31 proceeds to step S117 after determining in step S114 that target rotor operation angle AGtgde is not set so that the cooling water flow rate of cylinder head 1a increases in relation to basic value AGtgba of target rotor operation angle AGtg, that is, precedent target rotor operation angle AGtgde is substantially equal to basic value AGtgba.

In step S117, electronic control device 31 disables flag F. Then, in next step S118, electronic control device 31 controls the rotor operation angle of flow rate control valve 56 by setting basic value AGtgba to target rotor operation angle AGtgde and ends the changing of target rotor operation angle AGtgde as the knocking countermeasures.

Figure 7:
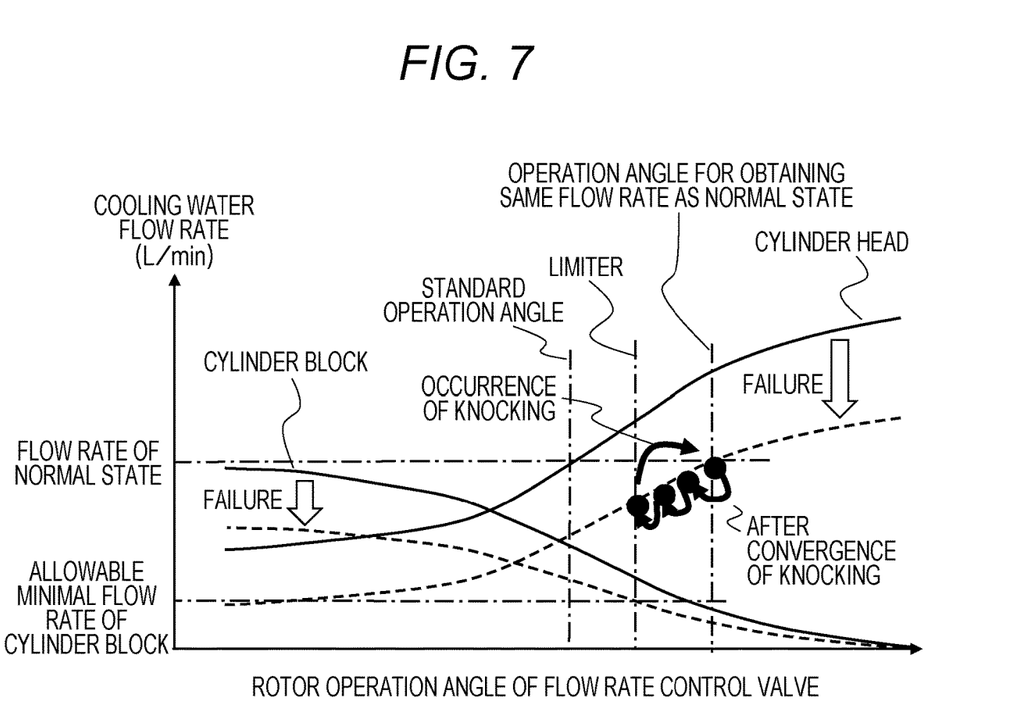
FIG. 7 is a diagram illustrating control characteristics of the rotor operation angle of the flow rate control valve of the embodiment of the invention.

FIG. 7 illustrates a change in target rotor operation angle AGtg in the event of the knocking.

In the failure state of the pump in which the knocking does not occur, target rotor operation angle AGtgde is determined by the limitation using limit value AGlimit. However, when the knocking occurs, electronic control device 31 cancels the limitation of limit value AGlimit and gradually changes target rotor operation angle AGtgde so that the cooling water flow rate of cylinder head 1a increases in relation to the case of limit value AGlimit. For example, the target rotor operation angle is gradually changed to the vicinity of the operation angle in which the flow rate in the normal pump state can be obtained.

While the knocking continuously occurs, electronic control device 31 keeps target rotor operation angle AGtgde at the vicinity of the operation angle in which the flow rate in the normal pump state can be obtained. When the knocking does not occur, target rotor operation angle AGtgde is gradually changed toward limit value AGlimit from the vicinity of the operation angle in which the flow rate in the normal pump state can be obtained.

In addition, when the time during which the flow rate of the cylinder block is lower than the minimal flow rate reaches the setting time, electronic control device 31 can change target rotor operation angle AGtgde toward limit value AGlimit or rapidly change target rotor operation angle AGtgde toward limit value AGlimit even in the event of the knocking.

While the content of the invention has been described in detail with reference to the preferred embodiment, it is obvious that various modifications can be made by the person skilled in the art based on the basic technical idea and teaching of the invention.

It is obvious that the cooling device including first cooling water passage 51 provided in cylinder head 1a and second cooling water passage 52 provided in cylinder block 1b of internal combustion engine 1 is not limited to the configuration exemplified in FIG. 1. For example, the control device and the control method according to the invention can be also applied to the cooling device having the configuration illustrated in FIG. 8.

Figure 8:
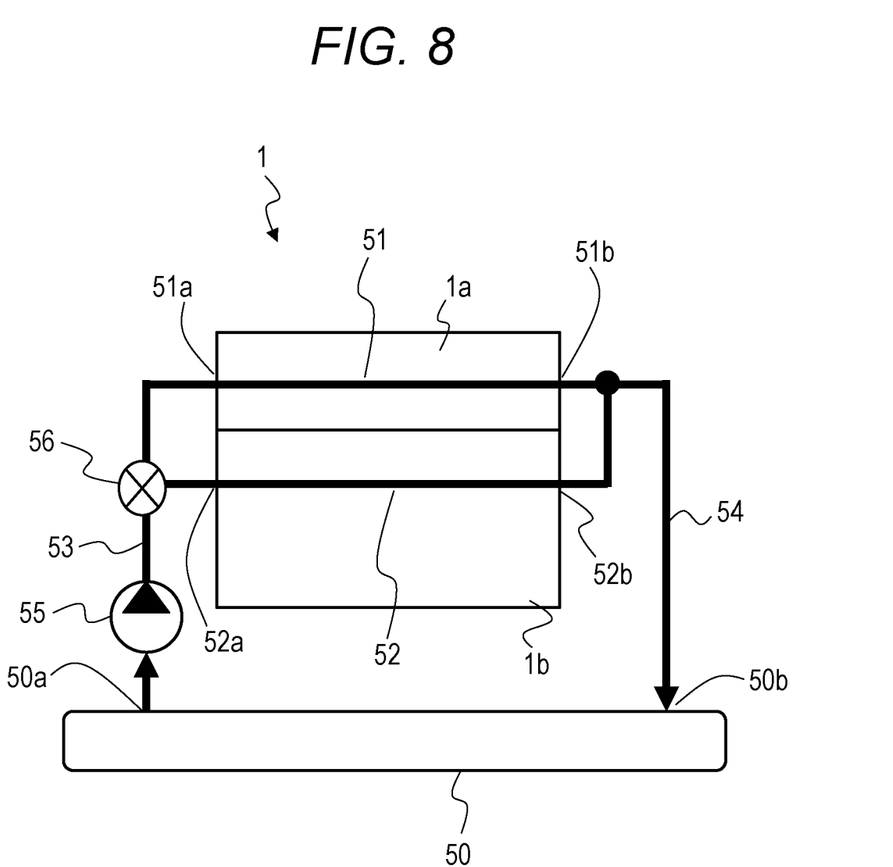
FIG. 8 is a diagram illustrating a cooling device of the internal combustion engine for a vehicle of the embodiment of the invention.

The cooling device illustrated in FIG. 8 includes radiator 50, first cooling water passage (first cooling medium passage) 51, second cooling water passage (second cooling medium passage) 52, cooling water supply path 53, a cooling water returning path 54, electric water pump 55, and flow rate control valve (three-way electromagnetic valve) 56. First cooling water passage 51 is provided in cylinder head 1a of internal combustion engine 1. Second cooling water passage 52 is provided in cylinder block 1b of internal combustion engine 1 in parallel to first cooling water passage 51. Cooling water supply path 53 has one end connected to outlet 50a of radiator 50 and is halfway branched into two parts to be respectively connected to inlet sides 51a and 52a of cooling water passages 51 and 52. Cooling water returning path 54 is connected to each of outlet sides 51b and 52b of cooling water passages 51 and 52, merged at the downstream side, and connected to inlet 50b of radiator 50.

Electric water pump 55 is provided in outlet 50a of radiator 50. Flow rate control valve 56 is provided in the branch part of cooling water supply path 53 and changes a ratio between the cooling water flow rate of first cooling water passage 51 and the cooling water flow rate of second cooling water passage 52. The cooling device is a system which circulates cooling water (or cooling liquid) as a cooling medium in internal combustion engine 1 by electric water pump 55.

In addition, flow rate control valve 56 is a mechanism which continuously changes the ratio between the cooling water flow rate of first cooling water passage 51 and the cooling water flow rate of second cooling water passage 52 in accordance with, for example, the operation angle of the rotor.

In the cooling device illustrated in FIG. 8, the cooling water discharged from electric water pump 55 is distributed to each of first cooling water passage 51 and second cooling water passage 52 in accordance with the ratio adjusted by flow rate control valve 56. Then, the cooling water flowing in first cooling water passage 51 increases in temperature by taking the heat of cylinder head 1a and the cooling water flowing in second cooling water passage 52 increases in temperature by taking the heat of cylinder block 1b. The cooling water increasing in temperature after passing through first cooling water passage 51 and second cooling water passage 52 enters radiator 50 together. The cooling water decreasing in temperature after losing the heat by radiator 50 is suctioned into electric water pump 55 so that the cooling water is supplied to each of first cooling water passage 51 and second cooling water passage 52.

That is, the cooling water is circulated in a closed path in order of internal combustion engine 1 (first cooling water passage 51 and second cooling water passage 52), radiator 50, electric water pump 55, internal combustion engine 1, and so on.

Furthermore, for example, the control of target rotor operation angle AGtg based on the detection of the knocking can be omitted, and the process of limiting an increase in engine load in the event of detecting the knocking can be performed.

Furthermore, when the process of limiting an increase in engine load is performed, electronic control device 31 can notify a driver of a vehicle equipped with internal combustion engine 1 of a state where the process of limiting an increase in engine load (engine output torque) is performed, by the use of an alarm lamp or the like.

Furthermore, flow rate control valve 56 is not limited to the rotor type. For example, an electromagnetic valve may be used as flow rate control valve 56, or a combination of a plurality of electromagnetic valves may be used as flow rate control valve 56.

Furthermore, electronic control device 31 can detect the failure in which the discharge flow rate of the pump decreases based on a decrease in pressure of the cooling water or the like.

Furthermore, when the failure in which the discharge flow rate of the pump decreases occurs, electronic control device 31 operates an electric fan provided in radiator 50 so that the heat radiation efficiency for the cooling water in radiator 50 is improved and the cooling water temperature at the outlet of radiator 50 decreases. Accordingly, an increase in temperature of cylinder head 1a can be suppressed.

Furthermore, the control device and the control method according to the invention can also be applied to the cooling device including an engine drive type water pump driven by internal combustion engine 1 instead of electric water pump 55. In the case of the cooling device including the engine drive type water pump, electronic control device 31 detects the occurrence of the failure in which the discharge amount of the engine drive type water pump decreases based on, for example, an increase in cooling water temperature or a decrease in cooling water pressure.

Then, when the refrigerant circulation flow rate becomes insufficient due to a decrease in discharge amount of the engine drive type water pump, electronic control device 31 can control flow rate control valve 56 so that the ratio of the refrigerant flow rate of first cooling water passage 51 becomes larger than that of a case where the refrigerant circulation flow rate is not insufficient, and further perform control of increasing the ratio of the refrigerant flow rate of first cooling water passage 51 based on the occurrence of the knocking and/or retarding the ignition timing based on the occurrence of the knocking.

REFERENCE SYMBOL LIST

1 Internal combustion engine
1a Cylinder head
1b Cylinder block
31 Electronic control device (control device)
50 Radiator
51 First cooling water passage (first cooling medium passage)
52 Second cooling water passage (second cooling medium passage)
53 Cooling water supply path
55 Electric water pump (pump)
56 Flow rate control valve (control valve)

The invention claimed is:

1. A control device comprising:
a computer that is configured to control a cooling device, the cooling device including: a first cooling medium passage provided in a cylinder head of an internal combustion engine; a second cooling medium passage provided in a cylinder block of the internal combustion engine; a control valve that changes a ratio of a refrigerant flow rate of the first cooling medium passage to a refrigerant flow rate of the second cooling medium passage; and an electric water pump that circulates the refrigerant, wherein the computer is configured to:
control the electric water pump such that a rotation speed of the electric water pump approaches an instruction rotation speed;
diagnose an occurrence of an abnormality of the electric water pump in which the rotation speed of the electric water pump does not reach the instruction rotation speed while the electric water pump is rotating; and
when the abnormality occurs, control the control valve so as to reduce a ratio of the refrigerant flow rate of the second cooling medium passage to the refrigerant flow rate of the first cooling medium passage, thus increasing the ratio of the refrigerant flow rate of the first cooling medium passage to the refrigerant flow rate of the second cooling medium passage.

2. The control device according to claim 1, wherein the computer controls the control valve such that the ratio of the refrigerant flow rate of the first cooling medium passage becomes larger than that of a case where knocking does not occur when the knocking occurs in the internal combustion engine while the abnormality occurs.

3. The control device according to claim 2, wherein the computer controls the control valve such that the refrigerant flow rate of the first cooling medium passage becomes equal to that of a case where the abnormality does not occur when the knocking occurs in the internal combustion engine while the abnormality occurs.

4. The control device according to claim 2, wherein the computer changes an ignition timing of the internal combustion engine in a retarding direction when the knocking occurs in the internal combustion engine while the abnormality occurs.

5. The control device according to claim 1, wherein the computer limits an increase in load of the internal combustion engine to be lower than that of a case where the abnormality does not occur when the abnormality occurs.

6. The control device according to claim 1, wherein the computer limits an operation of the control valve such that the ratio of the refrigerant flow rate of the first cooling medium passage does not exceed an upper limit value when the abnormality occurs.

7. The control device according to claim 1, wherein the computer controls the control valve such that the ratio of the refrigerant flow rate of the first cooling medium passage increases as the rotation speed of the electric water pump decreases with respect to the instruction rotation speed when the abnormality occurs.

8. The control device according to claim 1, wherein an outlet of the first cooling medium passage, an outlet of the second cooling medium passage, and an outlet of a radiator are connected to an inflow side of the control valve, and a suction port of the pump is connected to an outflow side of the control valve.

9. The control device according to claim 1, wherein an inlet of the first cooling medium passage and an inlet of the second cooling medium passage are connected to an outflow side of the control valve, and an discharge port of the pump is connected to an inflow side of the control valve.

10. A control method for a cooling device, the control method comprising:
controlling an electric water pump of the cooling device, refrigerant, wherein the electric water pump is controlled such that a rotation speed of the electric water pump approaches an instruction rotation speed;
diagnosing an occurrence of an abnormality of the electric water pump in which the rotation speed of the electric water pump does not reach the instruction rotation speed while the electric water pump is rotating; and
when the abnormality occurs, control the control valve so as to reduce a ratio of the refrigerant flow rate of the second cooling medium passage to the refrigerant flow rate of the first cooling medium passage, thus increasing the ratio of the refrigerant flow rate of the first cooling medium passage to the refrigerant flow rate of the second cooling medium passage.

11. The control method for a cooling device according to claim 10, further comprising:
a step of controlling the control valve such that the ratio of the refrigerant flow rate of the first cooling medium passage becomes larger than that of a case where knocking does not occur in the internal combustion engine when the knocking occurs in the internal combustion engine while the abnormality occurs.

* * * * *